United States Patent
Wong et al.

(10) Patent No.: US 9,909,905 B2
(45) Date of Patent: Mar. 6, 2018

(54) MULTI-PART AIR DATA PROBE ASSEMBLY TO FACILITATE RAPID REPLACEMENT

(71) Applicant: Honeywell International Inc., Morris Plains, NJ (US)

(72) Inventors: Yates Wong, Humboldt, AZ (US); Grant A. Gordon, Peoria, AZ (US); Richard Bonvouloir, Phoenix, AZ (US); Patrick Flynn, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 174 days.

(21) Appl. No.: 14/884,733

(22) Filed: Oct. 15, 2015

(65) Prior Publication Data
US 2017/0108360 A1 Apr. 20, 2017

(51) Int. Cl.
*G01D 21/00* (2006.01)
*G01D 11/30* (2006.01)
(Continued)

(52) U.S. Cl.
CPC .............. *G01D 11/30* (2013.01); *G01P 5/165* (2013.01); *G01P 13/025* (2013.01)

(58) Field of Classification Search
CPC ........ G01D 11/30; G01P 5/165; G01P 13/025
(Continued)

(56) References Cited

U.S. PATENT DOCUMENTS 3,514,999 A * 6/1970 Bagg et al. ............. G01P 5/165
                                                  73/861.68
4,275,603 A   6/1981 Kalocsay
(Continued)

FOREIGN PATENT DOCUMENTS

DE        692496       6/1940
DE       1252949      10/1967
(Continued)

OTHER PUBLICATIONS

European Patent Office, "Extended European Search Report for EP Application No. 16193606.7", "from U.S. Appl. No. 14/884,733", Dec. 16, 2016, pp. 1-8, Published in: EP.
(Continued)

*Primary Examiner* — Lisa Caputo
*Assistant Examiner* — Roger Hernandez-Prewitt
(74) *Attorney, Agent, or Firm* — Fogg & Powers LLC (57) ABSTRACT

A multi-part air data probe sensor assembly facilitating rapid replacement is provided. One example air data probe sensor assembly comprises a mount plate interface including at least one mount plate electrical connector configured to mate with electrical lines of an aircraft and at least one mount plate pneumatic connector configured to mate with pneumatic tubes of an aircraft; and a detachable sensor body having at least one sensor electrical connector that is coupled with the at least one mount plate electrical connector and at least one sensor pneumatic connector that is coupled with the at least one mount plate pneumatic connector; and a mechanical seal provided between the mount plate interface and the detachable sensor body, wherein the mechanical seal is composed of a moisture blocking material.

16 Claims, 6 Drawing Sheets

(51) Int. Cl.
    *G01P 5/165* (2006.01)
    *G01P 13/02* (2006.01)
(58) Field of Classification Search
    USPC .................. 73/866.5, 861.65, 863.58, 1.29
    See application file for complete search history.

(56) References Cited

U.S. PATENT DOCUMENTS

| | | | |
|---|---|---|---|
| 5,442,958 | A | 8/1995 | Hagen |
| 6,672,152 | B2 | 1/2004 | Rouse et al. |
| 7,334,467 | B1 | 2/2008 | DuPuis |
| 7,407,136 | B2 | 8/2008 | Murg |
| 7,597,018 | B2 | 10/2009 | Braun et al. |
| 2012/0137798 | A1* | 6/2012 | Vieules et al. .......... B64F 1/005 73/866.5 |

FOREIGN PATENT DOCUMENTS

| | | |
|---|---|---|
| EP | 1980860 A2 | 10/2008 |
| GB | 857427 | 12/1960 |

OTHER PUBLICATIONS

European Patent Office, "Communication pursuant to Article 94(3) EPC from EP Application No. 16193606.7 dated Dec. 13, 2017", "from Foreign Counterpart of U.S. Appl. No. 14/884,733", Dec. 13, 2017, pp. 1-5, Published in: EP.

* cited by examiner

MULTI-PART AIR DATA PROBE ASSEMBLY TO FACILITATE RAPID REPLACEMENT

BACKGROUND

In conventional systems, the air data probe is a single entity including a sensor body that is attached to the aircraft. These air data probes need to be replaced when the sensor body of the air probe is rendered defective. Currently, the replacement procedure involves detaching the entire assembly from the aircraft skin and installing a new data probe. The removal process includes loosening the caulking sealant, scraping the residual adhesive, disconnecting the electrical lines and the pneumatic tubes, and removing the air data probe. The aircraft skin then needs to be prepped for installation of the new air data probe. The electrical lines and pneumatic tubes are connected to the new probe assembly, the probe assembly is mechanically attached to the aircraft skin, sealants, paint and fillers are applied to the joint interface, and the remaining gaps are filled by providing a seal between the probe assembly and the aircraft.

Such a replacement procedure can be time consuming because of the amount of time taken for the caulking sealant to cure. Curing times for sealants can be very slow in adverse conditions such as extreme cold weather and result in considerable downtime before the aircraft can be released for flight. In some extreme instances the replacement process can take up to eight hours.

For reasons state above and for other reasons stated below, it will become apparent to those skilled in the art upon reading and understanding the specification, there is a need in the art for improved systems and methods for replacement of the sensor body of an air data probe.

SUMMARY

In one embodiment, an air data probe sensor assembly comprises a mount plate interface including at least one mount plate electrical connector configured to mate with electrical lines of an aircraft and at least one mount plate pneumatic connector configured to mate with pneumatic tubes of an aircraft; and a detachable sensor body having at least one sensor electrical connector that is coupled with the at least one mount plate electrical connector and at least one sensor pneumatic connector that is coupled with the at least one mount plate pneumatic connector; and a mechanical seal provided between the mount plate interface and the detachable sensor body, wherein the mechanical seal is composed of a moisture blocking material.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure address the need to replace a defective sensor body in a timely fashion by implementing a multiple-part air data probe assembly. In particular, a self sealing interface is integrated within the air data probe assembly's mount plate for facilitation of rapid removal and replacement of the sensor body. The air data probe is generally installed outside the aircraft on to the aircraft skin.

The implementation of the multiple-part air data assembly as described herein enables efficient replacement of the air data probe assembly with significantly reduced downtime while maintaining the air data probe sensor body's functional capabilities. Specifically, the air data probe assembly described herein includes a mount plate interface that is fixedly attached to aircraft fuselage. This mount plate interface may be sealed to the aircraft fuselage and does not need to be removed during replacement of the sensor body. The mount plate interface is primarily responsible for providing connections between the aircraft and the sensor body. Thus, the mount plate interface does not require replacement as frequently as the sensor body, and rapid replacement of the sensor body is facilitated. Further, because the mount plate interface may be designed to connect to aircraft in a manner similar to conventional air data probe systems, this air data probe assembly design can be applied to existing aircrafts.

Figure 1A:
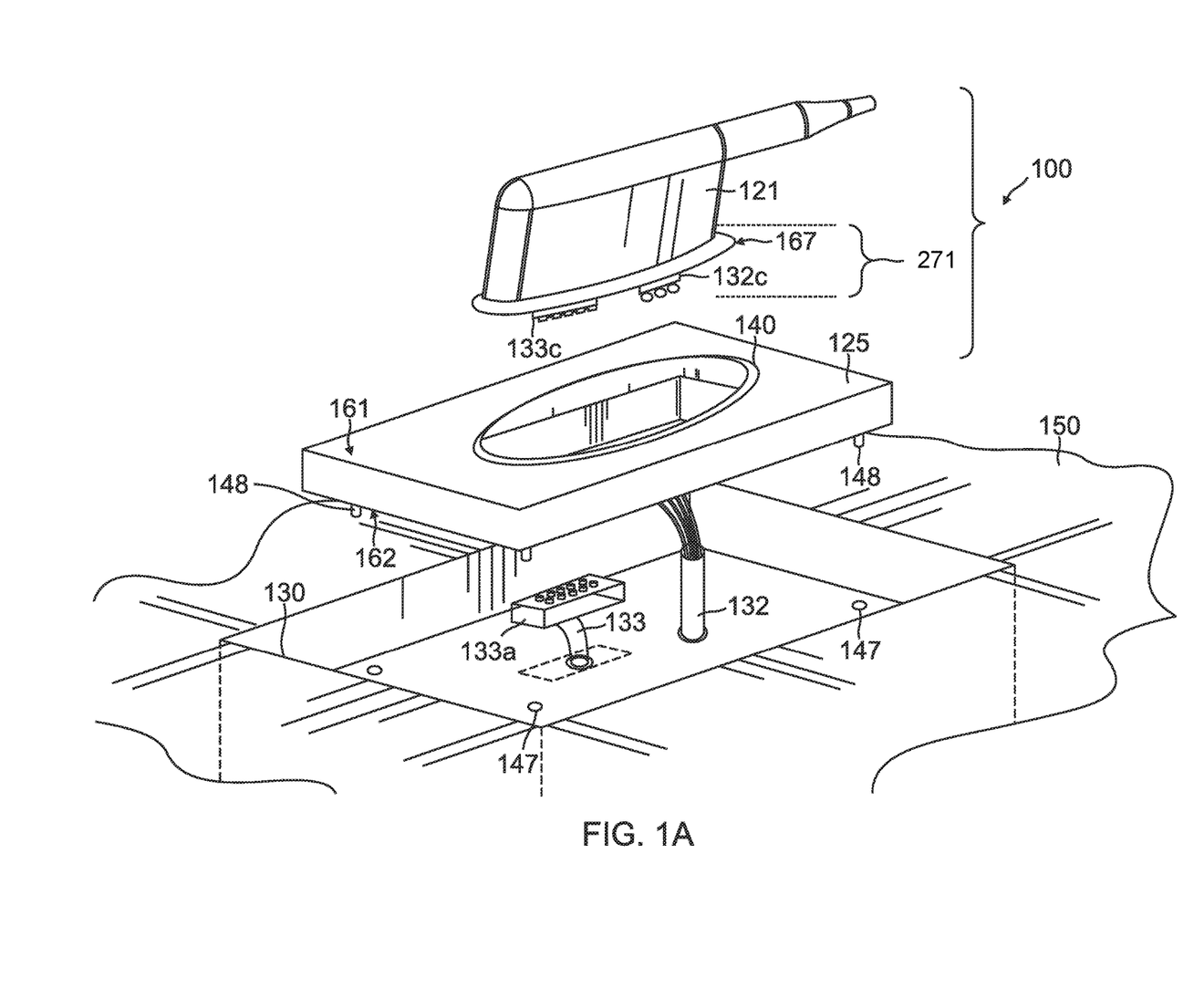
FIG. 1A is a diagram of an air data probe assembly including a mount plate interface and a sensor body of one embodiment of the present disclosure.

FIG. 1A is a perspective view of an example of an air data probe assembly 100 to be installed to aircraft skin 150. Aircraft skin 150 is generally an exterior shell covering the aircraft. As shown in FIG. 1A, air data probe assembly 100 comprises a mount plate interface 125 that may be fixedly attached to aircraft skin 150 and a detachable sensor body 121. The electrical line 133 and the pneumatic tube(s) 132 of the aircraft are connected to probe assembly 100 via mount plate interface 125. Mount plate interface 125 comprises at least one electrical connector 133b (as shown in FIG. 1C) to transfer the power generated by the electrical line 133 to the sensor body 121. Mount plate interface 125 further comprises at least one pneumatic tube connector 132b (as shown in FIG. 1C) to connect the pneumatic tube(s) 132 of the aircraft to sensor body 121.

Mount plate interface 125 has at least two sides, a first side 162 that can be attached to aircraft skin 150 and second side 161 reverse of the first side 162 facing sensor body 121. As shown in FIG. 1A, in one example, mount plate interface 125 further comprises a recess 140. Recess 140 is explained in further detail in FIG. 1B. As seen in FIG. 1C, electrical connector 133*b* is included in recess 140 and couples with an electrical connector 133*c* included in sensor body 121 to provide electrical connection from the aircraft to sensor body 121. Pneumatic connector 132*b* is included in recess 140 and couples with a pneumatic tube connector 132*c* of sensor body 121 to connect pneumatic tube(s) 132*c* of the aircraft to sensor body 121.

In one example, a first electrical connector 133*a* is mounted on aircraft skin 150, mount plate interface 125 includes at least one second electrical connector 133*b* (see FIG. 1C) and sensor body 121 includes a third electrical connector 133*c*. The electrical line 133 of the aircraft may be connected to sensor body 121 using multiple electrical connectors. In this example, the power generated by the electrical line of the aircraft is transferred to mount plate interface 125 via a first electrical connector 133*a* included on aircraft skin 150 that is connected to a second electrical connector 133*b* included in mount plate interface 125. The power is transferred to sensor body 121 via a third electrical connector 133*c* included in sensor body 121 coupled with an electrical connector 133*b*. As shown in FIG. 1C, the electrical connector 133*b* may have two interfaces: a first interface 182 that couples electrical connector 133*b* with electrical connector 133*c*, and a second interface 183 that couples electrical connector 133*b* with electrical connector 133*a*.

The pneumatic tubes 132 of the aircraft are also connected to probe assembly 100 via mount plate interface 125. In one example, the pneumatic tubes 132 of the aircraft may be connected directly to a first pneumatic tube connector 132*b* included in mount plate interface 125. In such an example, the first pneumatic tube connector 132*b* is then coupled with a second pneumatic tube connector 132*c* included in sensor body 121 to connect the pneumatic tubes of the aircraft to sensor body 121. Alternatively, the pneumatic tube(s) of the aircraft are connected to mount plate interface 125 by coupling a third pneumatic tube connector 132*a*, connector 132*a* attached to the aircraft skin to the first pneumatic connector 132*b*. First pneumatic tube connector 132*b* is coupled with second pneumatic tube connector 132*c* to connect the pneumatic tube(s) 132 of the aircraft to sensor body 121.

Figure 1B:
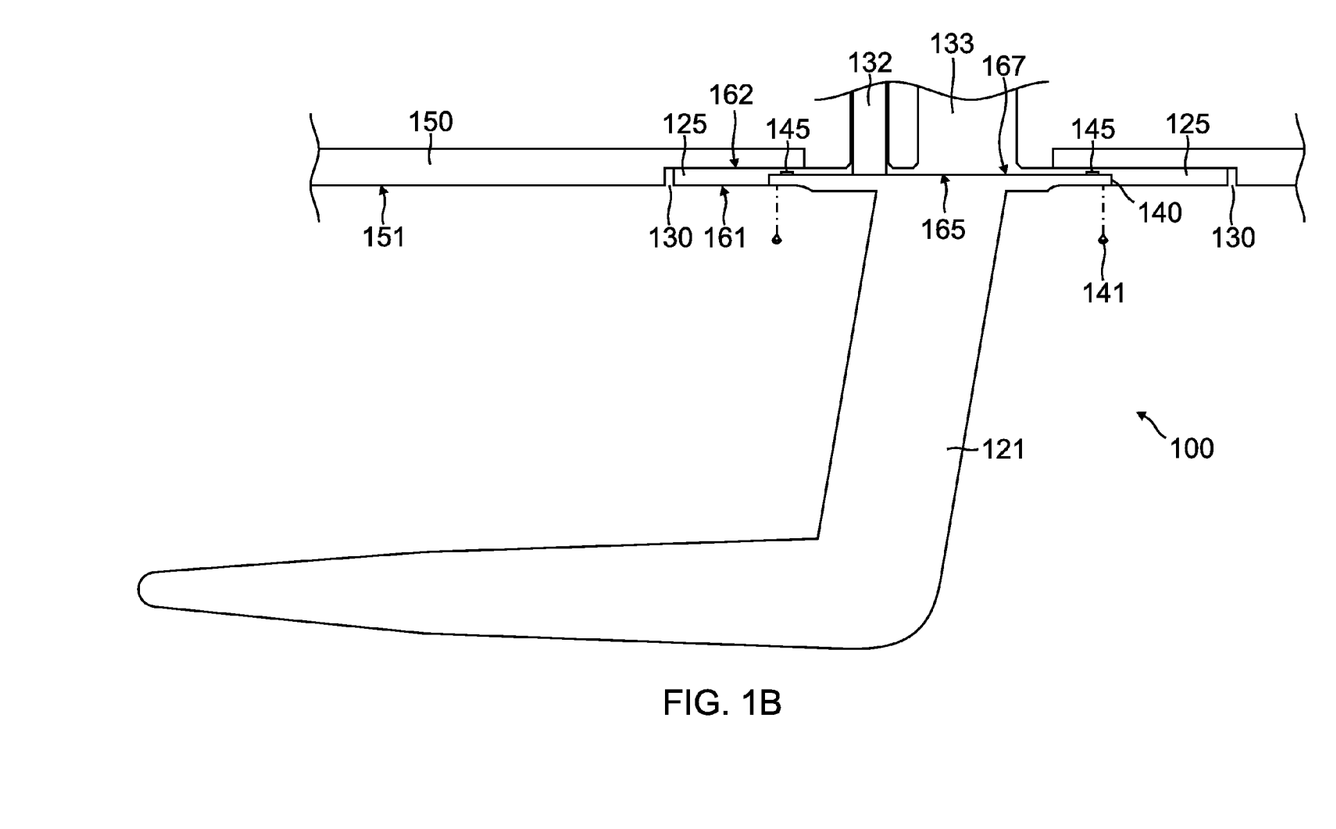
FIG. 1B is a cross sectional view of an air data probe assembly for one embodiment of the present disclosure when attached to an aircraft.
Figure 1C:
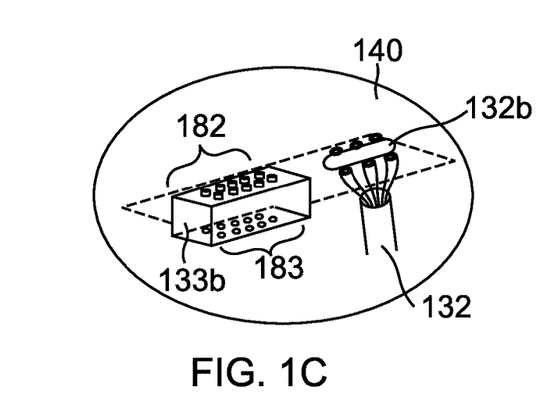
FIG. 1C is a perspective view of a recess comprised in a mount plate interface of an air data probe assembly for one embodiment of the present disclosure.

FIG. 1B is a cross section view of an example probe assembly 100 after probe assembly 100 has been installed on to the aircraft. As shown in FIG. 1B, mount plate interface 125 is sealed on to aircraft skin 150. In one implementation, after the pneumatic tube(s) and electrical line(s) of the aircraft are connected to mount plate interface 125, mount plate interface 125 can be mechanically attached to the aircraft skin 150 utilizing fasteners (such as threaded fasteners, for example). Any gaps 130 that remain between mount plate interface 125 and aircraft skin 150 after attaching mount plate interface 125 are sealed to prevent contamination and leakage into the aircraft from outside atmosphere. In one implementation, the gaps are sealed using a caulking seal. In further implementations, other fillers, paint or a combination thereof can also be applied to smooth out transition and fill interface gaps 130.

FIG. 1B further describes a sensor body 121 attached to mount plate interface 125. In the example shown in FIG. 1B, sensor body 121 is fitted into the recess 140 defined within mount plate interface 125. As shown in FIG. 1B, a surface 167 of sensor body 121 is attached to surface 165 in recess 140 of mount plate interface 125. Recess 140 is tailored to correspond with the dimensions of sensor body 121. Recess 140 allows sensor body 121 to be attached to mount plate interface 125 aligned with outer surface 151 of aircraft skin 150 and eliminates the need to paint after replacement of sensor body 121.

In the example shown in FIG. 1B, sensor body 121 is attached to mount plate interface by clamping it using threaded bolts 141. In other implementations, sensor body 121 may be attached to mount plate interface 125 by using threaded bolts, fasteners, other threaded connections or a combination of any of those. In yet another implementation, mount plate interface 125 includes slots in the interface for sensor body 121 to fit into.

As shown in FIG. 1B, air data probe assembly 100 further comprises a mechanical seal 145 provided between mount plate interface 125 and sensor body 121. Mechanical seal 145 prevents contamination and leakage into the aircraft from outside atmosphere. Mechanical seal 145 is composed of moisture-blocking materials (ex., silicon, rubber, etc.). Thus, when air data probe 100 malfunctions, sensor body 121 can be easily detached from mount plate interface 125 without requiring removal of caulking sealants, paint and fillers that may be applied to seal mount plate interface 125 to aircraft skin 150. Consequently, such a replacement process does not require reapplication of sealants and scraping of residual adhesive. Further, once the sensor body is detached from the mount plate interface, the electrical and pneumatic connections are automatically disconnected from the sensor body as the sensor body is removed. Thus, separate steps of disconnecting electrical lines or pneumatic tubes are also eliminated from the replacement process.

Figure 2A:
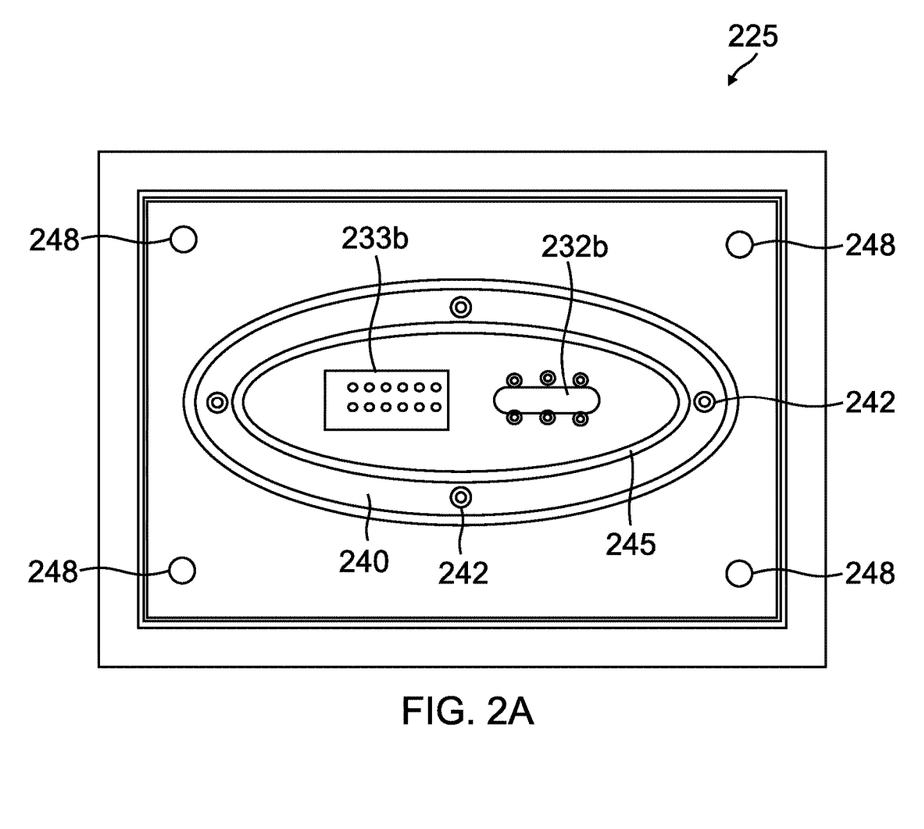
FIG. 2A is a view of an a mount plate interface included in an air data probe assembly for one embodiment of the present disclosure.

FIG. 2A is a view of an example mount plate interface 225 comprised in one embodiment of probe assembly 100 from a sensor interfacing side. As described above, sensor interfacing side of mount plate interface 225 is the side that faces the sensor body. Mount plate interface 225 includes a recessed interface 240 that includes at least one electrical connector 233*b* and at least one pneumatic tube connector 232*b*. In one example, mount plate interface 225 further includes dowel pins 248 utilized to locate the position and rotation of the assembly relative to aircraft. The pins 148 are manufactured on the mount plate interface 225 and clamped into precisely placed holes 147 on the aircraft skin 150 to be utilized for position control.

In one example, connection to electrical connector 233*b* is provided by directly connecting the electrical line 133 of the aircraft to mount plate interface 225. Alternatively, connection to electrical connector 233*b* is provided by coupling electrical connector 233*b* with an electrical connector 133*a* included on aircraft skin 150. In such an example, electrical connector 233*b* would have two interfaces: a first interface that mates with electrical connector 133*c* included in the sensor body, and a second interface on the opposing side that mates with electrical connector 133*a*. Electrical connector 233*b* as shown in the example of FIG. 2A is a male electrical connector. Accordingly, a compatible female electrical connector is provided on sensor body 121 to couple with electrical connector 233*b* and easily connect electrical line of the aircraft to sensor body 121. In other examples, the male connector can be provided in sensor body 121 and the female connector is included in mount plate interface 125.

Connection to pneumatic connector 232*b* is provided by directly connecting pneumatic tube(s) of the aircraft to mount plate interface 225 or by coupling pneumatic tube connector 232*b* to pneumatic tube connector 132*a* included on aircraft skin 150. Pneumatic tube connector 233b is further coupled with a compatible pneumatic tube connector provided on sensor body 121 to connect pneumatic tube(s) of the aircraft to sensor body 121.

In the example shown in FIG. 2A, a mechanical seal 245 is provided in recess 240 on mount plate interface 225. Mechanical seal 245 prevents contamination and leakage into the aircraft from outside atmosphere. Mechanical seal 245 is composed of moisture blocking materials including but not limited to rubber, silicon, etc. Such a mechanical seal does not require any curing time as needed in heat sealants such as a caulking sealant. In this example, mechanical seal 245 is provided at the perimeter of recess 240. Alternatively, mechanical seal 245 may be provided on sensor body 121. Sensor body 121 is attached to mount plate interface 225 such that mechanical seal 245 is between sensor body 121 and mount plate interface 225. In some examples, mount plate interface 225 provides holes 242 for attachment means (ex. threaded bolts, fasteners, other threaded connections, etc.) used to secure sensor body 121 into mount plate interface 225.

Figure 2B:
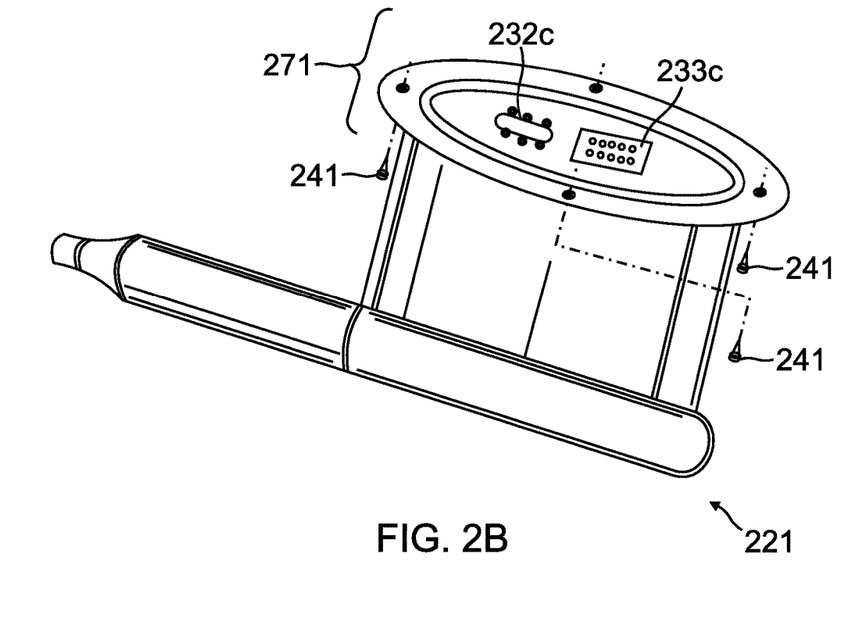
FIG. 2B is a top view of a sensor body included in an air data probe assembly of one embodiment of the present disclosure.

FIG. 2B is a perspective view of an example sensor body 221 comprised in one embodiment of probe assembly 100. Sensor body 221 includes at least one electrical connector 233c and at least one pneumatic tube connector 232c. Sensor body 221 may further include attachment means 241 to secure sensor body 221 into mount plate interface 125. Attachment means may include threaded bolts, fasteners, other threaded connections or a combination thereof. In one example, a mechanical seal is provided on sensor body 221 such that the mechanical seal is between sensor body 221 and mount plate interface 225 after installation.

In one implementation, sensor body 221 may be attached to mount plate interface 225 shown in FIG. 2A. In such an implementation, electrical connector 233c is coupled with an electrical connector 233b of mount plate interface 225, and pneumatic tube connector 232c is coupled with pneumatic tube connector 232b of mount plate interface 225. Mechanical seal 245 is provided between sensor body 221 and mount plate interface 225. Further, recessed interface 240 of mount plate interface 225 accommodates interfacing portion 271 of sensor body 221. Thus, no additional chemical seals need to be applied for functional or aesthetic purposes.

In a further such implementation, sensor body 221 is attached to mount plate interface 225 by utilizing threaded connection(s) 241, wherein threaded connection(s) 241 are aligned with holes 242. When sensor body 225 needs to be replaced, sensor body 225 is detached from mount plate interface 225 by unscrewing the threading connections 241 without requiring removal of caulking sealants, paint and fillers that may be applied to seal mount plate interface 125 to aircraft skin 150. Further, the electrical and pneumatic connections are automatically disconnected from the sensor body 221 when it is removed. Thus, separate steps of disconnecting electrical lines or pneumatic tubes are also eliminated from the replacement process.

Figure 3:
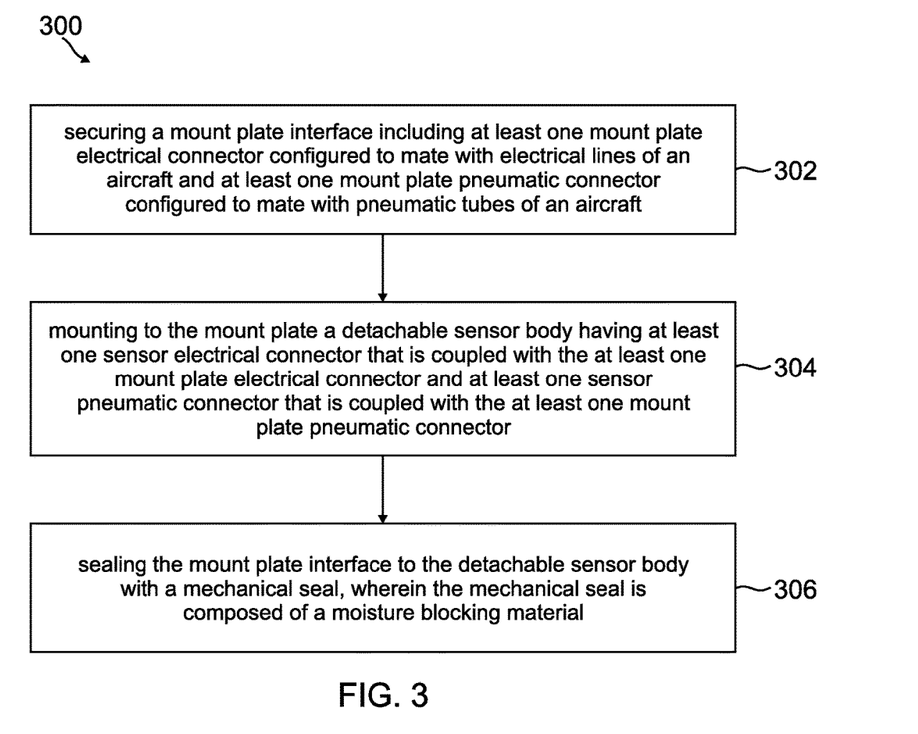
FIG. 3 describes a method of providing an air data probe assembly of one embodiment of the present disclosure.

FIG. 3 is a flow chart illustrating an example method 300 for providing an air data probe assembly. For some embodiments, the method of FIG. 3 can be implemented in any embodiment of the air data probe assembly or elements thereof described above.

The method starts at block 302 with securing a mount plate interface including at least one mount plate electrical connector configured to mate with electrical lines of an aircraft and at least one mount plate pneumatic connector configured to mate with pneumatic tubes of an aircraft. In one example securing a mount plate interface further comprises sealing the mount plate interface to aircraft skin using sealants, fillers, paint or a combination thereof. In one example, securing a mount plate interface further comprises providing a recess within the mount plate interface, the recess including the at least one mount plate electrical connector and the at least one mount plate pneumatic connector.

The method proceeds to block 304 with mounting to the mount plate a detachable sensor body having at least one sensor electrical connector that is coupled with the at least one mount plate electrical connector and at least one sensor pneumatic connector that is coupled with the at least one mount plate pneumatic connector. In one example of the method, mounting to the mount plate a detachable sensor body from the mount plate interface further comprises sealing a connector interface of the detachable sensor body to a recessed interface of the mount plate interface, wherein a mechanical seal is between the connector interface and the recessed interface. The detachable sensor body can be provided by clamping detachable sensor body to the mount plate interface using bolts, fasteners and other threaded connections. One example of this method further comprises locating the position and/or rotation of the aircraft using the detachable sensor body having access to dowel pins included in the mount plate.

The method proceeds to block 306 with sealing the mount plate interface and the detachable sensor body with a mechanical seal, wherein the mechanical seal is composed of a moisture blocking material. In one example, method 300 further comprises running electrical and pneumatic tests. In an example, method 300 is completed in 30 minutes or less.

EXAMPLE EMBODIMENTS

Example 1 includes an air data probe sensor assembly comprising: a mount plate interface including at least one mount plate electrical connector configured to mate with electrical lines of an aircraft and at least one mount plate pneumatic connector configured to mate with pneumatic tubes of an aircraft; and a detachable sensor body having at least one sensor electrical connector that is coupled with the at least one mount plate electrical connector and at least one sensor pneumatic connector that is coupled with the at least one mount plate pneumatic connector; and a mechanical seal provided between the mount plate interface and the detachable sensor body, wherein the mechanical seal is composed of a moisture blocking material.

Example 2 includes the assembly of Example 1, wherein the mount plate interface further comprises a recessed interface and the detachable sensor body further comprises a connector interface configured to mate with the recessed interface of the mount plate interface, and wherein the mechanical seal is provided between the recessed interface and the connector interface.

Example 3 includes the assembly of any of Examples 1-2, wherein the mount plate interface is fixedly attached to the aircraft skin, and wherein sealants, fillers, paint or a combination thereof seal gaps between aircraft skin and the mount plate interface.

Example 4 includes the assembly of any of Examples 1-3, wherein the sensor body is attached to mount plate interface using threaded bolts.

Example 5 includes the assembly of any of Examples 1-4, wherein the mount plate interface includes slots for the sensor body to fit into.

Example 6 includes the assembly of any of Examples 1-5, wherein the at least one mount plate electrical connector is configured to couple to an electrical connector mounted on aircraft skin of the aircraft.

Example 7 includes the assembly of any of Examples 1-6, wherein the at least one mount plate pneumatic connector is configured to couple to a pneumatic connector attached to aircraft skin of the aircraft.

Example 8 includes the assembly of any of Examples 1-7, wherein the mount plate interface comprises at least two dowel pins clamped with skin of the aircraft to locate position of the aircraft, and wherein the mount plate interface further includes a location interface connected to the sensor body.

Example 9 includes the assembly of any of Examples 1-8, wherein the electrical lines and pneumatic tubes of the aircraft are sealed within a cavity of the mount plate interface.

Example 10 includes a method for providing an air data probe assembly, the method comprising: securing a mount plate interface including at least one mount plate electrical connector configured to mate with electrical lines of an aircraft and at least one mount plate pneumatic connector configured to mate with pneumatic tubes of an aircraft; mounting to the mount plate a detachable sensor body having at least one sensor electrical connector that is coupled with the at least one mount plate electrical connector and at least one sensor pneumatic connector that is coupled with the at least one mount plate pneumatic connector; and sealing the mount plate interface to the detachable sensor body with a mechanical seal, wherein the mechanical seal is composed of a moisture blocking material.

Example 11 includes the method of Example 10, wherein mounting to the mount plate a detachable sensor body from the mount plate interface further comprises clamping detachable sensor body to the mount plate interface using bolts, fasteners and other threaded connections.

Example 12 includes the method of any of Examples 10-11, wherein mounting to the mount plate a detachable sensor body further comprises sealing a connector interface of the detachable sensor body to a recessed interface of the mount plate interface, wherein the mechanical seal is between the connector interface and the recessed interface.

Example 13 includes the method of any of Examples 10-12, wherein mounting to the mount plate a detachable sensor body further comprises clamping the detachable sensor body into the mount plate interface with threaded bolts.

Example 14 includes the method of any of Examples 10-13, wherein securing a mount plate interface further comprises sealing the mount plate interface to aircraft skin using sealants, fillers, paint or a combination thereof.

Example 15 includes the method of any of Examples 10-14, wherein electrical lines and pneumatic tubes of the aircraft are sealed within a cavity of the mount plate interface.

Example 16 includes the method of any of Examples 10-15, further comprising locating the position and/or rotation of the aircraft using the detachable sensor body having access to dowel pins included in the mount plate interface.

Example 17 includes the method of any of Examples 10-16, wherein providing the air data probe assembly is completed in 30 minutes or less.

Example 18 includes the method of any of Examples 10-17, further comprising running electrical and pneumatic tests.

Example 19 includes an air data probe sensor assembly comprising: a mount plate interface including a recess, wherein the mount plate interface includes a first connector configured to mate with electrical lines of an aircraft and a second connector configured to mate with pneumatic tubes of the aircraft; and a detachable sensor body having a connector interface configured to mate with the recess of the mount plate interface, the connector interface of the sensor body having a sensor electrical connector that is coupled with the first connector of the mount plate interface, and the connector interface of the sensor body further having a sensor pneumatic tube connector coupled to the second connector of the mount plate interface; and wherein the sensor electrical connector of the detachable sensor body and the sensor pneumatic connector of the detachable sensor body are positioned on a surface of the connector interface sealed within the recess of the mount plate when the detachable sensor body is mounted to the mount plate.

Example 20 includes the assembly of Example 19, wherein the mount plate interface is sealed using sealants, fillers, paint or a combination thereof.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An air data probe sensor assembly comprising:
    a mount plate interface including at least one mount plate electrical connector configured to mate with electrical lines of an aircraft and at least one mount plate pneumatic connector configured to mate with pneumatic tubes of the aircraft; and
    a detachable sensor body having at least one sensor electrical connector that is coupled with the at least one mount plate electrical connector and at least one sensor pneumatic connector that is coupled with the at least one mount plate pneumatic connector; and
    a mechanical seal provided between the mount plate interface and the detachable sensor body, wherein the mechanical seal is composed of a moisture blocking material;
    wherein the sensor body comprises a first surface configured to attach to a second surface in a recess of the mount plate interface, wherein the recess is configured to align an interfacing portion of the sensor body with an outer surface of an aircraft skin of the aircraft;
    wherein the at least one mount plate electrical connector is configured to couple to an electrical connector of the aircraft within the recess; and
    wherein the at least one mount plate pneumatic connector is configured to couple to a pneumatic connector of the aircraft within the recess.

2. The assembly of claim 1, wherein the detachable sensor body further comprises a connector interface configured to mate with the recessed interface of the mount plate interface, and wherein the mechanical seal is provided between the recessed interface and the connector interface.

3. The assembly of claim 1, wherein the mount plate interface is fixedly attached to the aircraft skin, and wherein sealants, fillers, paint or a combination thereof seal gaps between aircraft skin and the mount plate interface.

4. The assembly of claim 1, wherein the sensor body is attached to mount plate interface using threaded bolts.

5. The assembly of claim 1, wherein the mount plate interface includes slots for the sensor body to fit into.

6. The assembly of claim 1, wherein the mount plate interface comprises at least two dowel pins clamped with skin of the aircraft to locate position of the aircraft, and wherein the mount plate interface further includes a location interface connected to the sensor body.

7. The assembly of claim 1, wherein the electrical lines and pneumatic tubes of the aircraft are sealed within a cavity of the mount plate interface.

8. A method for providing an air data probe assembly, the method comprising:
  securing a mount plate interface including at least one mount plate electrical connector configured to mate with electrical lines of an aircraft and at least one mount plate pneumatic connector configured to mate with pneumatic tubes of an aircraft; and
  mounting to the mount plate a detachable sensor body having at least one sensor electrical connector that is coupled with the at least one mount plate electrical connector and at least one sensor pneumatic connector that is coupled with the at least one mount plate pneumatic connector; and
  sealing the mount plate interface and the detachable sensor body with a mechanical seal, wherein the mechanical seal is composed of a moisture blocking material;
  wherein the detachable sensor body comprises a first surface configured to attach to a second surface in a recess of the mount plate interface, wherein the recess is configured to align an interfacing portion of the sensor body with an outer surface of an aircraft skin of the aircraft;
  wherein the at least one mount plate electrical connector is configured to couple to an electrical connector of the aircraft within the recess; and
  wherein the at least one mount plate pneumatic connector is configured to couple to a pneumatic connector of the aircraft within the recess.

9. The method of claim 8, wherein mounting to the mount plate a detachable sensor body from the mount plate interface further comprises clamping detachable sensor body to the mount plate interface using bolts, fasteners and other threaded connections.

10. The method of claim 8, wherein mounting to the mount plate a detachable sensor body further comprises sealing a connector interface of the detachable sensor body to a recessed interface of the mount plate interface, wherein the mechanical seal is between the connector interface and the recessed interface.

11. The method of claim 8, wherein mounting to the mount plate a detachable sensor body further comprises clamping the detachable sensor body into the mount plate interface with threaded bolts.

12. The method of claim 8, wherein securing a mount plate interface further comprises sealing the mount plate interface to aircraft skin using sealants, fillers, paint or a combination thereof.

13. The method of claim 8, wherein electrical lines and pneumatic tubes of the aircraft are sealed within a cavity of the mount plate interface.

14. The method of claim 8, further comprising locating the position and/or rotation of the aircraft using the detachable sensor body having access to the dowel pins included in the mount plate interface.

15. An air data probe sensor assembly comprising:
  a mount plate interface including a recess, wherein the mount plate interface includes a first connector configured to mate with electrical lines of an aircraft and a second connector configured to mate with pneumatic tubes of the aircraft; and
  a detachable sensor body having a connector interface configured to mate with the recess of the mount plate interface, the connector interface of the sensor body having a sensor electrical connector that is coupled with the first connector of the mount plate interface, and the connector interface of the sensor body further having a sensor pneumatic tube connector coupled to the second connector of the mount plate interface; and
  wherein the sensor electrical connector of the detachable sensor body and the sensor pneumatic connector of the detachable sensor body are positioned on a surface of the connector interface sealed within the recess of the mount plate when the detachable sensor body is mounted to the mount plate;
  wherein the first connector is configured to couple to an electrical connector of the aircraft within the recess; and
  wherein the second connector is configured to couple to a pneumatic connector of the aircraft connector within the recess.

16. The assembly of claim 15, wherein the mount plate interface is sealed using sealants, fillers, paint or a combination thereof.

* * * * *